(12) United States Patent
Matsui et al.

(10) Patent No.: US 7,998,615 B2
(45) Date of Patent: Aug. 16, 2011

(54) NONAQUEOUS ELECTROLYTE FOR ELECTROCHEMICAL DEVICES

(75) Inventors: Tooru Matsui, Fujiidera (JP); Masaki Deguchi, Kadoma (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 941 days.

(21) Appl. No.: 11/033,321

(22) Filed: Jan. 12, 2005

(65) Prior Publication Data
US 2005/0158623 A1    Jul. 21, 2005

(30) Foreign Application Priority Data

Jan. 15, 2004    (JP) ................. 2004-008511

(51) Int. Cl.
*H01M 10/0566*    (2010.01)
*H01M 10/0567*    (2010.01)
*H01G 9/038*    (2006.01)

(52) U.S. Cl. ........ 429/199; 429/200; 429/201; 429/338; 361/502

(58) Field of Classification Search .................. None
See application file for complete search history.

(56) References Cited

U.S. PATENT DOCUMENTS

| | | | |
|---|---|---|---|
| 4,537,843 A | 8/1985 | Shishikura et al. | |
| 5,683,832 A | 11/1997 | Bonhote et al. | |
| 5,827,602 A | 10/1998 | Koch et al. | |
| 6,361,822 B1 * | 3/2002 | Kurose et al. | 427/77 |
| 6,485,868 B1 | 11/2002 | Tsujioka et al. | |
| 6,596,441 B1 | 7/2003 | Green et al. | |
| 6,855,458 B1 | 2/2005 | Kim et al. | |
| 2001/0024757 A1 | 9/2001 | Hwang et al. | |
| 2005/0019655 A1 | 1/2005 | Miyake et al. | |
| 2005/0164094 A1 * | 7/2005 | Kotato et al. | 429/331 |

FOREIGN PATENT DOCUMENTS

| | | |
|---|---|---|
| CN | 1317160 | 10/2001 |
| EP | 1 324 358 A2 | 7/2003 |
| EP | 1 365 427 A2 | 11/2003 |
| EP | 1 380 569 A1 | 1/2004 |
| EP | 1 458 046 A1 | 9/2004 |
| EP | 1 648 005 A1 | 4/2006 |
| JP | 11-297355 | 10/1999 |

(Continued)

OTHER PUBLICATIONS

Machine translation of JP 2001-256996, Sep. 2001.*

(Continued)

*Primary Examiner* — Jonathan Crepeau
(74) *Attorney, Agent, or Firm* — McDermott Will & Emery LLP

(57) ABSTRACT

The present invention relates to a nonaqueous electrolyte for electrochemical devices, and to electric double-layer capacitor and secondary battery using the said nonaqueous electrolyte. The nonaqueous electrolyte according to the present invention comprises a room temperature molten salt and a fluorohydrocarbon. The nonaqueous electrolyte is flame resistant and can suppress the rise in its viscosity. Therefore, high quality electrochemical devices can be obtained by using the nonaqueous electrolyte. The electric double-layer capacitor according to the present invention comprises a pair of polarizable electrode plates, a separator interposed between the pair of electrode plates, and the inventive nonaqueous electrolyte. The secondary battery according to the present invention comprises a positive electrode, a negative electrode, a separator interposed between the positive electrode and the negative electrode, and a nonaqueous electrolyte, wherein the nonaqueous electrolyte comprises the inventive nonaqueous electrolyte, and further comprises a lithium salt and a cyclic carbonate.

12 Claims, 1 Drawing Sheet

FOREIGN PATENT DOCUMENTS

| | | | |
|---|---|---|---|
| JP | 2000-106209 | * | 4/2000 |
| JP | 2000-348762 | A | 12/2000 |
| JP | 2001-143750 | A | 5/2001 |
| JP | 2001-185213 | A | 7/2001 |
| JP | 2001-256996 | A | 9/2001 |
| JP | 2002-110230 | | 4/2002 |
| JP | 2002-373704 | A | 12/2002 |
| JP | 2003-243028 | | 8/2003 |
| JP | 2004-006803 | | 1/2004 |
| JP | 2004-111359 | * | 4/2004 |
| JP | 2004-362872 | | 12/2004 |
| KR | 2001-0067049 | | 7/2001 |
| KR | 2003-0027171 | | 4/2003 |
| WO | WO 99/08299 | | 2/1999 |
| WO | WO 01/03229 | A1 | 1/2001 |
| WO | WO 03/054986 | A1 | 7/2003 |
| WO | WO 03/054998 | A1 | 7/2003 |

OTHER PUBLICATIONS

European Search Report issued in corresponding European Patent Application No. EP 05250110, dated Nov. 27, 2006.

M Ue. et al. "Application of Low-Viscosity Ionic Liquid to the Electrolyte of Double-Layer Capacitors", Journal of the Electrochemical Society, 2003, A499-A502, 150.4.

A. McEwen et al., "Electrochemical Properties of Imidazolium Salt Electrolytes for Electrochemical Capacitor Applications", Journal of the Electrochemical Society, 1999, 1687-1695, 146.5.

K. Xu et al., "Quaternary Onium Salts as Nonaqueous Electrolytes for Electrochemical Capacitors", Journal of the Electrochemical Society, 2001, A267-A274, 148.3.

* cited by examiner

NONAQUEOUS ELECTROLYTE FOR ELECTROCHEMICAL DEVICES

TECHNICAL FIELD OF THE INVENTION

The present invention relates to a nonaqueous electrolyte mainly used for electrochemical devices such as an electric double-layer capacitor and a secondary battery.

BACKGROUND ART

In an electric double-layer capacitor and a secondary battery, water-soluble electrolyte and nonaqueous electrolyte with an organic solvent are used. The nonaqueous electrolyte has the advantages of chargeable at high-voltage and raising energy density. On the other hand, the nonaqueous electrolyte has flammability, and thus the safety of the electric double-layer capacitor and the secondary battery has been a significant problem for a long time. For example, for a lithium ion secondary battery having a high capacity, in order to insure the safety, a protective circuit has to be used in combination with the battery so as to prevent overcharge and overdischarge.

In order to solve the problems caused by flammability of the nonaqueous electrolyte, it has been proposed to use a room temperature molten salt, namely the so-called ionic liquid, which is a liquid at room temperature, and has a tiny vapor pressure and is nonflammable. Japanese Patent No. 2981545 discloses a room temperature molten salt comprised of trimethylhexyl ammonium ion as a cation and $N(CF_3SO_2)_2-$ as an anion. The mixture of said molten salt and $LiN(CF_3SO_2)_2$ can be used as a nonaqueous electrolyte of a lithium ion secondary battery.

Although the room temperature molten salt is generally liquid at room temperature, and it tends to become jelly or to solidify in a supercooled state, over a period of time (for example, one day to several weeks). As a result, it is problematic that the viscosity of the nonaqueous electrolyte will rise and accordingly the internal resistance of the electric double-layer capacitor or the secondary battery will increase.

Specially, in a lithium ion secondary battery, in the case where a room temperature molten salt and a lithium salt are used as a nonaqueous electrolyte, problems such as the molten salt crystallizing out of the electrolyte will occur.

Therefore, in an electric double-layer capacitor, the room temperature molten salt generally may be used in a wide range of temperatures of from −20° C. to 85° C., it has the shortcoming of having a relatively small capacity specially at low temperature.

Furthermore, with the ever-increasing performance of electronic equipment, there is a demand for discharge load characteristics capable of high-rate discharge. However, the secondary battery of the prior arts is unable to meet this demand.

SUMMARY OF THE INVENTION

The first object of the invention is to overcome the above-mentioned problems in the prior arts and to provide a new nonaqueous electrolyte for electrochemical devices.

The second object of the invention is to provide high quality electrochemical devices.

In order to achieve the above-mentioned first object, the nonaqueous electrolyte according to the invention comprises a room temperature molten salt and a fluorohydrocarbon.

In order to achieve the above-mentioned second object, according to one aspect of the invention, there is provided an electric double-layer capacitor, comprising a pair of polarizable electrode plates, a separator interposed between the pair of electrode plates, and the inventive nonaqueous electrolyte.

Furthermore, according to another aspect of the invention, there is provided a secondary battery comprising a positive electrode, a negative electrode, a separator interposed between the positive electrode and the negative electrode, and a nonaqueous electrolyte, wherein the nonaqueous electrolyte comprises the inventive nonaqueous electrolyte, and further comprises a lithium salt and a cyclic carbonate.

The nonaqueous electrolyte of the present invention is flame resistant and can suppress the rise in its viscosity. Therefore, high quality electrochemical devices can be obtained by using the nonaqueous electrolyte.

DESCRIPTION OF THE PREFERRED EMBODIMENT

Figure 1:
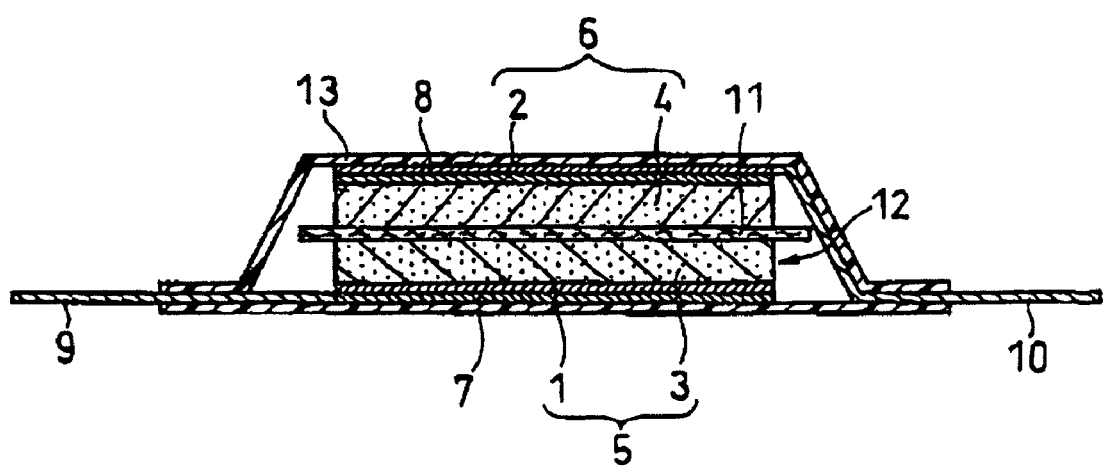
FIG. 1 is a schematic cross-sectional view of an electric double-layer capacitor as an example of the embodiments of the present invention.

The nonaqueous electrolyte for electrochemical devices according to the invention comprises a room temperature molten salt and a fluorohydrocarbon.

In this specification, the term "room temperature molten salt" means a liquid having ionic bonding at room temperature, such as 25°C. The room temperature molten salt can those known well in the prior arts, and it consists of an onium cation and a non-aluminate anion. For example, the onium cation can be at least one selected from ammonium, imidazolium, pyrrolidinium, phosphonium, sulfonium cations and the like; and the non-aluminate anion can be at least one selected from borate, phosphate, bis(trifluoromethanesulfonyl)imide and the like. According to the invention, the onium cations may be used each alone or in combination of two or more of them. Similarly, the non-aluminates may be used each alone or in combination of two or more of them.

The fluorohydrocarbon can be those well known in the prior arts. For example, the fluorohydrocarbon can be at least one selected from fluoro-aromatic hydrocarbon, monofluoroalkane and monofluoro-cycloalkane. According to the invention, the fluorohydrocarbons may be used each alone or in combination of two or more of them.

In the nonaqueous electrolyte according to the present invention, the molar ratio of the room temperature molten salt to the fluorohydrocarbon is generally in the range of from 4:0.5 to 4:16.

Moreover, the nonaqueous electrolyte according to the present invention may further comprise a carbonate, preferably a cyclic carbonate which is, for example, at least one selected from ethylene carbonate, propylene carbonate and butylene carbonate. According to the invention, the carbonates may be used each alone or in combination of two or more of them.

As an embodiment of the electrochemical devices according to the present invention, the electric double-layer capacitor comprises a pair of polarizable electrodes, a separator interposed between the pair of electrodes, and the above-mentioned inventive nonaqueous electrolyte.

In the nonaqueous electrolyte used in the electric double-layer capacitor, the room temperature molten salt functions as a solute. In addition, the nonaqueous electrolyte may further contain a lithium salt. In such a case, both of the room temperature molten salt and lithium salt function as solutes.

As another embodiment of the electrochemical devices according to the present invention, the secondary battery comprises a positive electrode, a negative electrode, a separator interposed between the positive electrode and the negative electrode, and a nonaqueous electrolyte, wherein the nonaqueous electrolyte comprises the above-mentioned inventive nonaqueous electrolyte, and further comprises a lithium salt and a cyclic carbonate.

In the nonaqueous electrolyte used in the secondary battery, the room temperature molten salt functions as a solvent, and the lithium salt functions as a solute.

According to the invention, the lithium salts may be used each alone or in combination of two or more of them lithium hexafluorophosphate ($LiPF_6$), $LiPF_3(CF_3)_3$, $LiPF_3(C_2F_5)_3$, $LiBF_4$, $LiBF_3CF_3$, $LiBF_3(C_2F_5)$, $LiBF_3(C_3F_7)$, $LiN(CF_3SO_2)_2$(LiTFSI), $LiN(C_2F_5SO_2)_2$, and $LiN(CF_3SO_2)(C_4F_9SO_2)$ Hereinafter, the present invention will be described in detail by means of examples.

EXAMPLE

A schematic cross-sectional view of an electric double-layer capacitor as an example of the electrochemical devices of the present invention is shown in FIG. 1.

Example 1

An electric double-layer capacitor as shown in FIG. 1 was fabricated as follows. First, two active material layers 3, 4 were coated respectively onto aluminum foil current collectors 1, 2, and thus a pair of polarizable electrode plates 5, 6 were formed. A separator 11 made of polypropylene nonwovens was interposed between the two electrode plates 5, 6. Then aluminum collector plates 7, 8 were laminated with the aforesaid members being superimposed between them, so as to form a plate electrode assembly 12. Leads 9, 10 were welded to the collector plates 7, 8. The active material coating layers on the polarizable electrode plates 5, 6 face toward the separator 11. Two leads 9, 10 were oriented towards opposite directions and the plate electrode assembly 12 was fixed with a tape (not shown in FIG. 1). Next, the plate electrode assembly 12 was accommodated in tube 13 made of a polypropylene laminate film including an aluminum foil therein. An opening of tube 13 through which lead 9 leads out was fused together with lead 9 and then the opening was sealed. A nonaqueous electrolyte was injected into tube 13 via the other opening of tube 13 through which lead 10 leads out. As for treatments made before sealing the opening, electrical charge and discharge were carried out four times (with upper limit voltage of 2.1 V, lower limit voltage of 0V, constant current of 4 mA), then decompressed and degassed (−750 mmHg, 10 second). Then, the opening of tube 13 was fused together with lead 10 and the opening was sealed.

Polarizable electrode plates 5, 6 were fabricated as follows. Activated carbon powder made from phenol resin and having specific surface area of 1700 $m^2/g$ as an active material of the active material layers 3, 4, acetylene black as a conductive material, ammonium salt of carboxymethyl cellulose as a binder, water and methanol as a dispersant were mixed at a weight ratio of 10:2:1:100:40. The obtained mixture was coated onto one surface of aluminum current collectors 1, 2 having thickness of approximately 20 μm, then dried, and thus active material layers 3, 4 having thickness of appromixately 80 μm were formed. The active material layers were cut to the size of appromimately 35 mm×35 mm, and current collectors 1, 2 and collector plates 7, 8 were ultrasonically welded.

The nonaqueous electrolyte was prepared by mixing trimethylpropyl-ammonium .bis[trifluoromethanesulfonyl]imide (hereinafter referred to as TMPA.TFSI) as a room temperature molten salt and fluorobenzene (hereinafter referred to as FB) as a fluorohydrocarbon at a molar ratio of 2:1. The obtained nonaqueous electrolyte was used to produce the electric double-layer capacitor as shown in FIG. 1.

Comparative Example 1

An electric double-layer capacitor was fabricated in the same manner as in Example 1, except that the nonaqueous electrolyte consisted of TMPA.TFSI as a room temperature molten salt.

The electric double-layer capacitors fabricated in Example 1 and Comparative Example 1 were subjected to a low-temperature cycle test. Namely the electric double-layer capacitors were repeatedly charged and discharged at −10 C with an upper limit voltage of 2.5V, a lower limit voltage of 0V and a constant current of 8 mA. After 50 cycles, capacities of the electric double-layer capacitors were measured at a temperature of −10° C. The results are shown in Table 1.

TABLE 1

| | Capacity of the electric double-layer capacitor/mAh |
|---|---|
| Example 1 | 1.2 |
| Comparative Example 1 | 0.7 |

As is clearly shown in Table 1, capacity of the electric double-layer capacitor according to Example 1 is 1.2 mAh, while capacity of the electric double-layer capacitor according to Comparative Example 1 is 0.7 mAh, thereby the nonaqueous electrolyte of Example 1 resulted in a larger capacity of the electric double-layer capacitor at a low temperature as compared with the nonaqueous electrolyte of Comparative Example 1. It is considered that this is due to the fact that FB was mixed in the room temperature molten salt and thus the viscosity of the nonaqueous electrolyte decreased, and the internal resistance of the electric double-layer capacitors could not rise easily.

Example 2

Electric double-layer capacitors were fabricated in the same manner as in Example 1, except that the nonaqueous electrolytes were prepared by mixing TMPA.TFSI as a room temperature molten salt and a fluorohydrocarbon selected from those described below in Table 2 at a molar ratio of 2:1.

The electric double-layer capacitors of Example 2 and Comparative Example 1 were charged at a temperature of 20° C. with an upper limit voltage of 2.5V and a constant current of 8 mA, then kept for 1 hour at a constant voltage of 2.5V, afterward discharged with a lower limit voltage of 0V and a constant current of 8 mA. Then the capacitors were charged again with an upper limit voltage of 2.5V and a constant current of 8 mA, and placed in a constant temperature chamber of −10° C. for one week, then the temperature was returned to 20° C., and the capacitors were discharged with a lower limit voltage of 0V and a constant current of 8 mA. The remaining capacities of the electric double-layer capacitors were measured. The results are shown in Table 2.

TABLE 2

| | fluorohydrocarbon | Capacity of the electric double-layer capacitor/mAh |
|---|---|---|
| Example 2 | Fluoro-aromatic compound | |
| | Fluorobenzene | 1.6 |
| | o-fluorotoluene | 1.5 |
| | m-fluorotoluene | 1.5 |
| | p-fluorotoluene | 1.5 |
| | Benzotrifluoride | 1.5 |
| | Monofluoro-alkanes | |
| | I-fluorobutane | 1.7 |
| | n-amylfluoride | 1.6 |
| | n-hexylfluoride | 1.6 |
| | n-heptylfluoride | 1.5 |
| | n-dodecylfluoride | 1.4 |
| | n-tridecylfluoride | 1.2 |
| | n-tetradecylfluoride | 1.0 |
| | n-pentadecylfluoride | 0.7 |
| | Monofluoro-cycloalkanes | |
| | fluorocyclopentane | 1.6 |
| | fluorocyclohexane | 1.6 |
| | fluorocycloheptane | 1.6 |
| | fluorocyclooctane | 1.5 |
| | fluorocyclononane | 1.2 |
| | fluorocyclodecane | 1.0 |
| | fluorocycloundecane | 0.6 |
| Comparative Example 1 | None | 0.1 |

As is clearly shown in Table 2, the remaining capacities of the capacitors of Example 2 were 0.6 mAh or more, while the remaining capacity of the capacitor of Comparative Example 1 was 0.1 mAh and almost no capacity was maintained. When TMPA.TFSI as the nonaqueous electrolyte of electric double-layer capacitor according to Comparative Example 1 was placed at −10° C., solidification was observed and it is considered the solidification results in the low remaining capacity. Moreover, there is an inflexion point of the capacities between n-dodecylfluoride and n-tridecylfluoride among the monofluoro-alkanes. And there also is an inflexion point of the capacities between fluorocyclooctane and fluorocyclononane among the monofluoro-cycloalkanes. Therefore, in view of the capacities of the capacitors, it is preferred that prmonofluoro-alkanes have 12 or less carbon atoms, namely no greater than the number of carbon atoms of n-dodecylfluoride, and that the monofluoro-cycloalkanes have 8 or less carbon atoms, namely no greater than the carbon atoms of fluorocyclooctane.

It is apparent that those fluorohydrocarbons listed in the above Table 2 may be used each alone or in combination of two or more of them.

Example 3

Electric double-layer capacitors were fabricated in the same manner as in Example 1, except that the nonaqueous electrolytes were prepared by mixing each of the room temperature molten salts described below in Table 3 and FB as a fluorohydrocarbon at a molar ratio of 2:1.

Comparative Example 2

Electric double-layer capacitors were fabricated in the same manner as in Example 1, except that the nonaqueous electrolytes consisted of the room temperature molten salts shown in Table 3.

The electric double-layer capacitors according to Example 3 and Comparative Example 2 were subjected to a low-temperature cycle test. Namely, the electric double-layer capacitors were repeatedly charged and discharged at a temperature of −10° C., with an upper limit voltage of 2.5V, a lower limit voltage of 0V and a constant current 8 mA. After 50 cycles, capacities of the electric double-layer capacitors according to Example 3 and Comparative Example 2 were measured at a temperature of −10° C. The results are shown in Table 3.

TABLE 3

| | Capacity of the electric double-layer capacitor/mAh | |
|---|---|---|
| Room temperature molten salt | Example 3 | Comparative Example 2 |
| EMI•BF$_4$ | 1.3 | 0.5 |
| EMI•TFSI | 1.2 | 0.4 |
| BPr•BF$_4$ | 1.3 | 0.5 |
| P12•TFSI | 1.3 | 0.5 |
| P14•PF$_3$(C$_2$F$_5$)$_3$ | 1.2 | 0.3 |
| PP13•TFSI | 1.2 | 0.4 |
| THTDPh•BF$_4$ | 1.1 | 0.2 |
| DEHS•BF$_4$ | 1.2 | 0.3 |

In Table 3, the abbreviations of the room temperature molten salts are denoted as follows.

EMI.BF$_4$: 1-ethyl-3-methylimidazolium.tetrafluoroborate
EMI.TFSI: 1-ethyl-3-methylimidazolium.bis[trifluoromethanesulfonyl] imide
BPr.BF$_4$: n-butyl-pyridinium-tetrafluoroborate
P12.TFSI: 1-ethyl-1-methylpyrrolidinium.bis[trifluoromethanesulfonyl] imide
P14.PF$_3$(C$_2$F$_5$)$_3$: 1-butyl-1-methylpyrrolidinium tris(pentafluoroethyl)trifluorophosphate
PP13.TFSI: 1-propyl-1-methylpiperidinium.bis[trifluoromethanesulfonyl]imide
THTDPh.BF$_4$: trihexyl(tetradecyl) phosphonium tetrafluoroborate
DEHS.BF$_4$: diethylhexylsulfonium.tetrafluoroborate As is clearly shown in Table 3, capacities of the capacitors of Example 3 were 1.1 mAh or more, while capacities of the capacitors of Comparative Example 2 were 0.5 mAh or less. Thereby the nonaqueous electrolytes of Example 3 resulted in larger capacities of the electric double-layer capacitor at a low temperature as compared with the nonaqueous electrolytes of Comparative Example 2. It is considered that this is due to the fact that FB was mixed in the room temperature molten salt and thus the viscosities of the nonaqueous electrolyte decreased, and the internal resistances of the electric double-layer capacitors could not rise easily.

It is apparent that those room temperature molten salts listed in the above Table 3 may be used each alone or in combination of two or more of them.

Example 4

Electric double-layer capacitors were fabricated in the same manner as in Example 1, except that the nonaqueous electrolytes were prepared by mixing TMPA.TFSI as a room temperature molten salt and p-fluorotoluene (hereinafter referred to as p-TL) as a fluorohydrocarbon, then further mixing at least one cyclic carbonate selected from the group consisting of ethylene carbonate (hereinafter referred to as EC), propylene carbonate (hereinafter referred to as PC) and butylene carbonate (hereinafter referred to as BC) at the molar ratios shown in Table 4.

Comparative Example 3

An electric double-layer capacitor was fabricated in the same manner as in Example 1, except that the nonaqueous electrolyte was prepared by mixing TMPA.TFSI as a room temperature molten salt and p-TL as a fluorohydrocarbon at a molar ratio of 2:1.

The electric double-layer capacitors according to Example 4 and Comparative Example 3 were subjected to a high-temperature cycle test. Namely the electric double-layer capacitors were repeatedly charged and discharged at a temperature of 60° C., with an upper limit voltage of 2.5V, a lower limit voltage of 0V and a constant current of 8 mA. Cycle life is represented by the numbers of cycle at which capacity of the electric double-layer capacitor becomes 90% of the initial capacity. The results are shown in Table 4.

TABLE 4

|  | Molar ratio | Cycle life (Numbers of cycle) |
|---|---|---|
| Example 4 | TMPA•TFSI:p-TL:EC = 2:1:1 | 2836 |
|  | TMPA•TFSI:p-TL:PC = 2:1:1 | 2741 |
|  | TMPA•TFSI:p-TL:BC = 2:1:1 | 2611 |
|  | TMPA•TFSI:p-TL:(EC:PC) = 4:2:(1:1) | 2997 |
|  | TMPA•TFSI:p-TL:(EC:BC) = 4:2:(1:1) | 2872 |
|  | TMPA•TFSI:p-TL:(EC:PC:BC) = 6:3:(1:1:1) | 2954 |
| Comparative Example 3 | TMPA•TFSI:p-TL = 2:1 | 1090 |

As is clearly shown in Table 4, the cycle lives of the capacitors of Example 4 were 2600 cycles or more, while the cycle life in Comparative Example 3 was 1090 cycles. It thus can be concluded that an electric double-layer capacitor having excellent high-temperature cycle characteristics can be obtained by adding cyclic carbonate in the nonaqueous electrolyte, as is shown by the nonaqueous electrolytes of Example 4.

Example 5

Electric double-layer capacitors were fabricated in the same manner as in Example 1, except that different nonaqueous electrolytes were prepared by mixing TMPA.TFSI as a room temperature molten salt with p-TL, then further mixing with at least one cyclic carbonate selected from the group consisting of ethylene carbonate (EC), propylene carbonate (PC) and butylene carbonate (BC) at the molar ratios shown in the below Table 5.

The electric double-layer capacitors of Example 5 were charged at a temperature of 20° C. with an upper limit voltage of 2.5V and a constant current of 8 mA, then kept for 1 hour at a constant voltage of 2.5V. Afterwards, the capacitors were discharged at a lower limit voltage of 0V and a constant current of 8 mA. The remaining capacities of the electric double-layer capacitors were then measured. The results are shown in Table 5.

TABLE 5

| Molar ratio | Capacity of the electric double-layer capacitor/mAh |
|---|---|
| TMPA•TFSI:p-TL:(EC:PC) = 4:0.5:(1:1) | 1.6 |
| TMPA•TFSI:p-TL:(EC:PC) = 4:1:(1:1) | 1.8 |
| TMPA•TFSI:p-TL:(EC:PC) = 4:2:(1:1) | 1.7 |
| TMPA•TFSI:p-TL:(EC:PC) = 4:4:(1:1) | 1.3 |
| TMPA•TFSI:p-TL:(EC:PC) = 4:8:(1:1) | 0.9 |

As is clearly shown in Table 5, the capacities of the electric double-layer capacitors varied with the molar ratio of TMPA.TFSI to p-TL. When the molar ratios of TMPA.TFSI to p-TL were 4:4, 4:8 and 4:0.5 respectively, the capacities decreased. It thus can be concluded that the molar ratio of TMPA.TFSI to p-TL is preferably from 4:1 to 4:2. If the amount of p-TL decreases in respect to the amount of TMPA.TFSI, the viscosity of the nonaqueous electrolyte and the internal resistance increases, and thus the capacity decreases. In contrast, when the amount of p-TL increases in respect to the amount of TMPA.TFSI, the amount of ions for forming the electrical double layer decreases, and thus the capacity decreases.

Example 6

Electric double-layer capacitors were fabricated in the same manner as in Example 1, except that different nonaqueous electrolytes were prepared by mixing TMPA.TFSI as a room temperature molten salt and EC as a cyclic carbonate at the molar ratios shown in Table 6.

Flammability and solidifiability of the nonaqueous electrolytes fabricated according to Example 6 were tested. The test of flammability was carried out by penetrating these nonaqueous electrolytes into asbestos and using a burner to make an ignition test. Meanwhile, the test of solidifiability was carried out by keeping these nonaqueous electrolytes at a temperature of −10° C. for one week and observing whether or not they were solidified. The results are shown in Table 6.

TABLE 6

| Molar ratio of TMPA•TFSI:EC | Flammability | Solidifiability |
|---|---|---|
| 1:0 | nonflammable | solidifying |
| 1:1 | nonflammable | non-solidifying |
| 1:2 | nonflammable | non-solidifying |
| 1:3 | nonflammable | non-solidifying |
| 1:4 | catching fire | non-solidifying |

As is clearly shown in Table 6, flammability and solidifiability of the nonaqueous electrolytes varied with the molar ratio of TMPA.TFSI to EC. When the molar ratio of TMPA.TFSI:EC was from 1:0 to 1:3, there was no ignition, while when the molar ratio of TMPA.TFSI:EC was from 1:1 to 1:4, there was no solidification. Therefore, in view of both the flammability and the solidifiability, the preferred molar ratio of TMPA.TFSI: EC is in the range of from 1:1 to 1:3.

Example 7

This example is to give description to a lithium ion secondary battery. A positive electrode plate and a negative electrode plate were used to substitute the pair of polarizable electrode plates in the aforementioned electric double-layer capacitor. A positive electrode active material layer was formed of the positive electrode plate and a negative electrode active material layer was formed of the negative electrode plate. An aluminum foil current collector was used as the positive electrode current collector, and a copper foil current collector instead of aluminum foil current collector was used as the negative electrode current collector. An aluminum collector plate was used as the positive electrode collector plate, and a copper collector plate instead of aluminum collector plate was used as the negative electrode collector plate. The separator was likewise made of polypropylene nonwovens. As for treatments made before sealing, the secondary battery was charged for eight hours at a constant current of 0.7 mA, then decompressed and degassed (−750 mmHg, 10 second). Except the aforementioned steps, the secondary battery was fabricated in the same manner as in the case of the electric double-layer capacitor. The plate electrode assembly and the nonaqueous electrolyte were sealed into a tube made of laminate film.

Next, preliminary charges and discharges were made, namely the charges and discharges were made repeatedly for five times with a constant current of 0.7 mA, an upper limit voltage of 4.2V and a lower limit voltage of 3.0V Based on the weight of the positive electrode active material, the battery capacity was 140 mAh/g.

The positive electrode plate was fabricated as follows. Lithium cobalt oxide powder 85 parts by weight as an active material of the active material layer, acetylene black 10 parts by weight as a conductive material, polyvinylidene fluoride resin 5 parts by weight as a binder, and dehydrated N-methyl-2-pyrrolidone as a dispersant were mixed. The obtained mixture was coated onto one surface of the aluminum foil current collector having a thickness of approximately 20 μm and then dried, and thus an active material layer having a thickness of approximately 80 μm was formed. The active material layer was cut to the size of approximately 35 mm×35 mm, then the current collector and the collector plate with the leads were ultrasonically welded.

The negative electrode plate was fabricated as follows. Synthetic graphite powder 75 parts by weight as an active material of the active material layer, acetylene black 20 parts by weight as a conductive material, polyvinylidene fluoride resin 5 parts by weight as a binder, and dehydrated N-methyl-2-pyrrolidone as a dispersant were mixed. The obtained mixture was coated onto one surface of the copper foil current collector having a thickness of approximately 20 μm and then dried, and thus an active material layer having a thickness of approximately 80 μm was formed. The active material layer was cut to the size of 35 mm×35 mm, and the current collector and the collector plate with the leads were ultrasonically welded.

The nonaqueous electrolyte was prepared by mixing TMPA.TFSI as a room temperature molten salt, FB as a fluorohydrocarbon, EC as a cyclic carbonate and lithium hexafluorophosphate (hereinafter referred to as $LiPF_6$) as a lithium salt at a molar ratio of 1:1:2:0.4. The prepared nonaqueous electrolyte was used to make a lithium ion secondary battery.

Comparative Example 4

A lithium ion secondary battery was fabricated in the same manner as in Example 7, except that the nonaqueous electrolyte was prepared by mixing TMPA.TFSI as a room temperature molten salt, EC as a cyclic carbonate and $LiPF_6$ as a lithium salt at a molar ratio of 1:2:0.4.

The lithium ion secondary batteries according to Example 7 and Comparative Example 4 were charged at a temperature of 20° C. with a constant current of 0.7 mA until the upper limit voltage reached 4.2V. Then the batteries were discharged at the constant currents shown in Table 7 until the lower limit voltage reached 3.0V. The discharge capacities of the lithium ion secondary batteries were measured. The results are shown in Table 7.

TABLE 7

| Discharge current/mA | Capacity of the lithium ion secondary battery/(mAh/$LiCoO_2$-g) | |
|---|---|---|
| | Example 7 | Comparative Example 4 |
| 0.7 | 140 | 138 |
| 1.4 | 139 | 131 |
| 2.8 | 137 | 97 |
| 5.6 | 105 | 28 |
| 14 | 56 | 7 |

As is clearly shown in Table 7, the discharge capacities of the secondary batteries of Example 7 were greater than those of Comparative Example 4. When the nonaqueous electrolyte contained FB as a fluorohydrocarbon, the load capability for high rate discharge of the battery were improved. It is considered the mixing of FB into the nonaqueous electrolyte renders the lower viscosity of the nonaqueous electrolyte.

Example 8

A lithium ion secondary battery was fabricated in the same manner as in Example 7, except that the nonaqueous electrolyte was prepared by mixing 1-butyl-1-methyl pyrrolidinium-.tris(pentafluoroethyl)trifluorophosphate (hereinafter referred to as $P14.PF_3(C_2F_5)_3$) as a room temperature molten salt, FB as a fluorohydrocarbon, EC as a cyclic carbonate and $LiPF_6$ as a lithium salt at a molar ratio of 1:1:2:0.4.

Comparative Example 5

A lithium ion secondary battery was fabricated in the same manner as in Example 7, except that the nonaqueous electrolyte was prepared by mixing $P14.PF_3(C_2F_5)_3$ as a room temperature molten salt, EC as a cyclic carbonate and $LiPF_6$ as a lithium salt at a molar ratio of 1:2:0.4.

The lithium ion secondary batteries according to Example 8 and Comparative Example 5 were charged at a temperature of 20° C. and a constant current of 0.7 mA until the upper limit voltage reached 4.2V, and then were kept in the charged state for one day at 85° C. Then, the temperatures of those lithium ion secondary batteries were returned to 20° C., and the secondary batteries were discharged at the constant current of 0.7 m.A until the lower limit voltage reached 3.0V. Then the remaining capacities of the lithium ion secondary batteries were measured. Moreover, the amounts of gas generated in the lithium ion secondary batteries were measured immediately after they were kept at 85° C. The results are shown in Table 8.

TABLE 8

| | Capacity of the lithium ion battery/(mAh/$LiCoO_2$-g) | Amount of the generated gas/mL |
|---|---|---|
| Example 8 | 105 | 0.067 |
| Comparative Example 5 | 77 | 0.28 |

As is clearly shown in Table 8, the remaining capacity of the battery of Example 8 was 105 mAh, while the remaining capacity of the battery of Comparative Example 5 was as low as 77 mAh. Furthermore, the amount of gas generated by the battery of the Example 8 was 0.067 ml, while the amount of gas generated by the battery of Comparative Example 5 was as high as 0.28 ml. It thus can be concluded that the amount of gas generated in the battery of Comparative Example 5, which did not contain FB in the nonaqueous electrolyte, was larger. It is presumed that FB formed a protective film on the negative electrode and thus suppressed the decomposition of the nonaqueous electrolyte.

Example 9

A lithium ion secondary battery was fabricated in the same manner as in Example 7, except that the nonaqueous electrolyte was prepared by mixing TMPA.TFSI as room temperature molten salt, FB as a fluorohydrocarbon, EC as a cyclic carbonate and $LiPF_6$ as a lithium salt at a molar ratio of 1:1:2:0.4.

Comparative Example 6

A lithium ion secondary battery was fabricated in the same manner as in Example 7, except that the nonaqueous electrolyte was prepared by mixing TMPA.TFSI as a room temperature molten salt, diethylcarbonate (DEC) as a chain carbonate, EC as a cyclic carbonate and $LiPF_6$ as a lithium salt at a molar ratio of 1:1:2:0.4.

The evaluations were made in the same manner as in Example 8. The remaining capacities of the lithium ion secondary batteries after being kept at 85° C. and the amount of gas generated in the lithium ion secondary batteries immediately after being kept at 85° C. were measured. The results are shown in Table 9.

TABLE 9

| | Capacity of the lithium ion battery/(mAh/LiCoO$_2$-g) | Amount of the generated gas/mL |
|---|---|---|
| Example 9 | 112 | 0.053 |
| Comparative Example 6 | 62 | 0.43 |

As is clearly shown in Table 9, the remaining capacity of the battery of Example 9 was 112 mAh, while the remaining capacity of the battery of Comparative Example 6 was as low as 62 mAh. Furthermore, the amount of the generated gas of the battery of Example 9 was 0.053 ml, while the amount of the generated gas of the battery of Comparative Example 6 was as high as 0.43 ml. It thus can be concluded that in the case where DEC was contained in the nonaqueous electrolytes, the lithium ion secondary battery has a small remaining capacity and a big amount of the generated gas. It can also be concluded that by replacing FB of the nonaqueous electrolyte of Example 9 with DEC as used in Comparative Example 6, the viscosity of the nonaqueous electrolyte decreased, but the amount of the generated gas at high temperature differed remarkably.

Example 10

Lithium ion secondary batteries were fabricated in the same manner as in Example 7, except that the nonaqueous electrolytes were prepared by mixing TMPA.TFSI as a room temperature molten salt, p-TL as a fluorohydrocarbon, EC as a cyclic carbonate and each of the lithium salts as shown in Table 10 at a molar ratio of 1:1:2:0.4.

The evaluations were made in the same manner as in Example 8. The remaining capacities of the lithium ion secondary batteries after being kept at 85° C. and the amounts of the generated gas in the lithium ion secondary batteries immediately after being kept at 85° C. were measured. The results are shown in Table 10.

TABLE 10

| Lithium salt | Capacity of the lithium ion battery/(mAh/LiCoO$_2$-g) | Amount of the generated gas/mL |
|---|---|---|
| $LiPF_6$ | 115 | 0.048 |
| $LiPF_3(CF_3)_3$ | 117 | 0.043 |
| $LiPF_3(C_2F_5)_3$ | 120 | 0.039 |
| $LiBF_4$ | 102 | 0.044 |
| $LiBF_3CF_3$ | 106 | 0.041 |
| $LiBF_3(C_2F_5)$ | 111 | 0.036 |
| $LiBF_3(C_3F_7)$ | 118 | 0.030 |
| $LiN(CF_3SO_2)_2$ | 96 | 0.055 |
| $LiN(C_2F_5SO_2)_2$ | 101 | 0.051 |
| $LiN(CF_3SO_2)(C_4F_9SO_2)$ | 109 | 0.047 |

As is clearly shown in Table 10, when the lithium salts as shown in Table 10 were used as solute of the nonaqueous electrolytes, the capacity decrease due to the storage at a high-temperature storage was small and the amounts of the generated gas was also small.

It is apparent that the lithium salts may be used each alone or in combination of two or more of them.

Example 11

Lithium ion secondary batteries were fabricated in the same manner as in Example 7, except that the nonaqueous electrolytes were prepared by mixing TMPA.TFSI as a room temperature molten salt, p-TL as a fluorohydrocarbon, EC as a cyclic carbonate and $LiPF_6$ as a lithium salt at the molar ratios as shown in Table 11.

The lithium ion secondary batteries according to Example 11 were charged at a temperature of 20° C. with a constant current of 0.7 mA until the upper limit voltage reached 4.2V, then discharged with the constant currents of 0.7 mA until the lower limit voltage reached 3.0V Then the discharge capacities of the lithium ion secondary batteries were measured. The results are shown in Table 11.

TABLE 11

| Molar ratio | Capacity of the lithium ion secondary battery/(mAh/LiCoO$_2$-g) |
|---|---|
| TMPA•TFSI:p-TL:EC:$LiPF_6$ = 1:0.25:2:0.4 | 123 |
| TMPA•TFSI:p-TL:EC:$LiPF_6$ = 1:0.5:2:0.4 | 133 |
| TMPA•TFSI:p-TL:EC:$LiPF_6$ = 1:1:2:0.4 | 137 |
| TMPA•TFSI:p-TL:EC:$LiPF_6$ = 1:2:2:0.4 | 134 |
| TMPA•TFSI:p-TL:EC:$LiPF_6$ = 1:4:2:0.4 | 102 |

As is clearly shown in Table 11, capacities of the lithium ion secondary batteries varied with the molar ratio of TMPA.TFSI to p-TL. When the molar ratios of TMPA.TFSI to p-TL were 1:0.25 and 1:4 respectively, the capacities decreased. It thus can be concluded that, the molar ratio of TMPA.TFSI to p-TL is preferably in the range of from 1:0.5 to 1:2. If the amount of p-TL in respect to TMPA.TFSI decreases, then the viscosity of the nonaqueous electrolyte increases, and thus the internal resistance of the lithium ion secondary battery increases. In contrast, if the amount of p-TL in respect to TMPA.TFSI increases, then the amount of the carrier ions decreases, and thus the capacity decreases.

Example 12

Lithium ion secondary batteries were fabricated in the same manner as in Example 7, except that different nonaqueous electrolytes were prepared by mixing TMPA·TFSI as a room temperature molten salt, EC as a cyclic carbonate and bis[trifluoromethanesulfonyl]imidelithium (hereinafter referred to as LiTFSI) as a lithium salt at the molar ratios as shown in Table 12.

Flammabilities and solidifiabilities of the nonaqueous electrolyte prepared according to Example 12 were determined. The test of flammability was carried out by infiltrating these nonaqueous electrolytes into asbestos and using a burner to perform a fire-catching test. Meanwhile, the test of solidifiability was carried out by keeping these nonaqueous electrolytes at a temperature of −10° C. for one week and observing whether or not they were solidified. The results are shown in Table 12.

TABLE 12

| Molar ratio of TMPA•TFSI:EC:LiTFSI | Flammability | Solidifiability |
|---|---|---|
| 1:0:0.1 | Nonflammable | Solidifying |
| 1:1:0.1 | Nonflammable | non-solidifying |
| 1:2:0.1 | Nonflammable | non-solidifying |
| 1:3:0.1 | Nonflammable | non-solidifying |
| 1:4:0.1 | catching fire | non-solidifying |

As is clearly shown in Table 12, flammability and solidifiability varied with the molar ratio of TMPA.TFSI:EC:LiPF$_6$. When the molar ratio of TMPA.TFSI:EC was from 1:0 to 1:3, there was no fire-catching, while when the molar ratio of TMPA.TFSI: EC was from 1:1 to 1:4, there was no solidification. Therefore, in view of both the flammability and the solidifiability, the preferred molar ratio of TMPA.TFSI:EC is in the range of from 1:1 to 1:3.

Example 13

Now, a secondary battery using lithium metal as a negative electrode will be described. Secondary batteries were fabricated in the same manner as those for the aforementioned lithium ion secondary battery, except that lithium metal was used as the negative electrode plate, and the lithium metal was pressed onto the copper collector plate as a negative electrode collector plate.

After being sealed, preliminary charges and discharges were made, namely the secondary batteries were charged and discharged repeatedly for five times with a constant current of 0.7 mA, between an upper limit voltage of 4.3V and a lower limit voltage of 3.0V Based on the weight of the positive electrode active materials, the battery capacity is 146 mAh/g.

A nonaqueous electrolytes was prepared by mixing TMPA.TFSI as a room temperature molten salt, FB as a fluorohydrocarbon and LiTFSI as a lithium salt at a molar ratio of 1:0.2:0.1. A secondary battery was prepared by using the prepared nonaqueous electrolyte and taking lithium metal as a negative electrode.

Comparative Example 7

A lithium ion secondary battery was fabricated in the same manner as in Example 13, except that the nonaqueous electrolyte was prepared by mixing TMPA.TFSI as a room temperature molten salt and LiTFSI as a lithium salt at a molar ratio of 1:0.1.

The secondary batteries taking the lithium metal as a negative electrode according to Example 13 and Comparative Example 7 were charged and discharged repeatedly at a temperature of 20° C. with a constant current of 1.4 mA and an upper limit voltage of 4.3V until a dendrite deposition of lithium formed on the negative electrode penetrated through the separator made of polypropylene nonwovens and accordingly caused an internal short circuit. Then the numbers of cycle were measured. The results are shown in Table 13.

TABLE 13

|  | Number of cycle/cycles |
|---|---|
| Example 13 | 51 |
| Comparative Example 7 | 8 |

As is clearly shown in Table 13, the number of cycles in Example 13 was 51, while the number of cycle in Comparative Example 7 was 8. It can be concluded that just as in the nonaqueous electrolyte of Example 13, due to the addition of the fluorohydrocarbon, the deposition of the dendrite of lithium was suppressed.

In the aforementioned examples, polypropylene nonwovens were used as the separator, however, it isn't limited thereto. For example, polyethylene nonwovens separator, polymethylpentene nonwovens separator and polyphenylene sulfide nonwovens separator may also be used.

Furthermore, as the secondary battery in which the nonaqueous electrolyte was used, lithium ion secondary battery was taken as an example, but in addition to the lithium ion secondary battery, magnesium secondary battery and the like can also achieve the similar technical effects.

What is claimed is:

1. A secondary battery comprising:
   a positive electrode,
   a negative electrode,
   a separator interposed between the positive electrode and the negative electrode, and
   a nonaqueous electrolyte,
   characterized in that, the nonaqueous electrolyte comprises a room temperature molten salt, a fluorohydrocarbon and a lithium salt,
   wherein the room temperature molten salt consists of an onium cation and a non-aluminate anion,
   the onium cation is at least one selected from the group consisting of quaternary ammonium, imidazolium, pyridinium, pyrrolidinium, 1-propyl-1-methylpiperidinium, phosphonium and sulfonium cations; and
   when said onium cation is quaternary ammonium, the room temperature molten salt is Trimethylpropylammonium·bis[trifluoromethanesulfonyl]imide, and
   when said onium cation is pyridinium, the room temperature molten salt is n-butyl-pyridinium·tetrafluoroborate, and
   wherein said fluorohydrocarbon is at least one selected from the group consisting of monofluoro-alkane and monofluoro-cycloalkane.

2. The secondary battery according to claim 1, wherein the monofluoro-alkane is at least one selected from the group consisting of 1-fluorobutane, n-amylfluoride, n-hexylfluoride, n-heptylfluoride, n-dodecylfluoride, n-tridecylfluoride, n-tetradecylfluoride and n- pentadecylfluoride; and the monofluoro-cycloalkanes is at least one selected from the group consisting of fluorocyclopentane, fluorocyclohexane, fluorocycloheptane, fluorocyclooctane, fluorocyclononane, fluorocyclodecane and fluorocycloundecane.

3. The secondary battery according to claim 1, wherein the molar ratio of the room temperature molten salt to the fluorohydrocarbon is in the range of 4:0.5 to 4:16.

4. The secondary battery according to claim 1, further comprising a carbonate.

5. The secondary battery according to claim 4, wherein the carbonate is at least one cyclic carbonate selected from the group consisting of ethylene carbonate, propylene carbonate and butylene carbonate.

6. The secondary battery according to claim 1, wherein the molar ratio of the room temperature molten salt to the fluorohydrocarbon is in the range of 1:0.5 to 1:2.

7. The secondary battery according to claim 1, further comprising a cyclic carbonate, wherein the molar ratio of the room temperature molten salt to the cyclic carbonate is in the range of 1:1 to 1:3.

8. The secondary battery according to claim 1, further comprising a cyclic carbonate, wherein the molar ratio of the room temperature molten salt: the fluorohydrocarbon: the cyclic carbonate: the lithium salt is in the range of 1:0.25-4:2:0.4.

9. The secondary battery according to claim 8, wherein the molar ratio of the room temperature molten salt: the fluorohydrocarbon: the cyclic carbonate: the lithium salt is 1:0.5-2:2:0.4.

10. The secondary battery according to claim 1, wherein the lithium salt is at least one selected from the group consisting of lithium hexafluorophosphate ($LiPF_6$), $LiPF_3(CF_3)_3$, $LiPF_3(C_2F_5)_3$, $LiBF_4$, $LiBF_3CF_3$, $LiBF_3(C_2F_5)$, $LiBF_3(C_3F_7)$, $LiN(CF_3SO_2)_2$, $LiN(C_2F_5SO_2)_2$, and $LiN(CF_3SO_2)(C_4F_9SO_2)$.

11. The secondary battery according to claim 10, wherein the lithium salt is at least one selected from lithium hexafluorophosphate and bis[trifluoromethanesulfonyl]- imidelithium.

12. the secondary battery according to claim 1, wherein the room temperature molten salt is 1-ethyl-3- methylimidazolium · tetrafluoroborate, when said onium cation is imidazolium.

* * * * *